United States Patent [19]

Tsukuda

[11] Patent Number: 4,815,657
[45] Date of Patent: Mar. 28, 1989

[54] ROOM TEMPERATURE CONTROLLING APPARATUS USED FOR AN AIR CONDITIONER

[75] Inventor: Hiroshi Tsukuda, Shiga, Japan

[73] Assignee: Daikin Industries, Ltd., Osaka, Japan

[21] Appl. No.: 55,057

[22] Filed: May 28, 1987

[30] Foreign Application Priority Data

May 28, 1986 [JP] Japan ............................ 61-122639

[51] Int. Cl.⁴ ............................................ G05D 23/00
[52] U.S. Cl. ...................................... 236/47; 165/11.1
[58] Field of Search ................ 236/47, 46 R, 78 R, 236/78 D; 165/12, 11 R

[56] References Cited

U.S. PATENT DOCUMENTS

| | | | |
|---|---|---|---|
| 3,964,677 | 6/1976 | Schalow et al. | 236/46 R |
| 4,505,426 | 3/1985 | Rossi et al. | 236/47 |
| 4,524,908 | 6/1985 | Marshall et al. | 236/68 B X |
| 4,623,969 | 11/1986 | Bensoussan et al. | 236/47 X |

FOREIGN PATENT DOCUMENTS 60-174448 of 1985 Japan.

Primary Examiner—William E. Wayner
Attorney, Agent, or Firm—Birch, Stewart, Kolasch & Birch

[57] ABSTRACT

A room temperature controlling apparatus used for an air conditioner includes a thermistor for detecting the temperature in a room, a variable resistor for setting a reference temperature for said room, a pyroelectric infrared sensor for detecting movement of a person in said room and outputting signals representative of the detection of the movement of said person, a room temperature modification circuit for modifying the room temperature detected by said thermistor based on the signals transferred from said pyroelectric infrared sensor, and a comparator for outputting a signal to control the operation of the air conditioner according to the reference temperature set by said variable resistor and the room temperature modified by said temperature modification circuit.

8 Claims, 5 Drawing Sheets

ROOM TEMPERATURE CONTROLLING APPARATUS USED FOR AN AIR CONDITIONER

BACKGROUND OF THE INVENTION

The present invention relates to a room temperature controlling apparatus used for an air conditioner, by which a preset temperature in a room can be changed based on the degree of movement of persons present in a room.

Conventionally, a room temperature controlling apparatus functions to control temperature in a room to a preset value or thereabout based on the temperature detected by a temperature sensor installed in the main body of an air conditioner. For instance, when in a cooling operation mode, the air conditioner stops cooling if the detected temperature is lower than the preset value so that it maintains the temperature in the room at a value near the preset temperature. The above described apparatus, however, functions in the same manner irrespective of the existence of people in the room, thus it is impossible to operate the air conditioner based on the presence of persons in the room.

Therefore, some apparatuses, such as one disclosed in Japanese Laid-open Pat. Publication No. 174448/1985, for instance, have been recently proposed, which can detect whether or not a person is in a room, and control operation of an air conditioner based on the presence of human beings.

FIG. 8 is a block diagram showing the apparatus described above. In this drawing, numeral 101 designates a wireless remote control unit, and numeral 102 designates a main body.

The wireless remote control unit 101 consists of a room temperature sensor 103, an infrared sensor 104, controls 105, and a transmitter 106.

The main body 102 comprises a room temperature sensor 107, controls 108, and a receiver 109.

With the construction above, if the infrared sensor 104 detects the presence of a human body, the wireless remote control unit 101 transfers a signal representative of room temperature signal from the transmitter 106 to the receiver 109 by activating the controls 105 based on the temperature detected by the room temperature sensor 103 provided in the wireless remote control unit 101 which sensor 103 normally positioned adjacent to the human body. Thus, the apparatus controls the operation of the air conditioner based on the temperature adjacent to the human body so that persons in the room feel comfortable.

However, the apparatus thus constructed has the following disadvantage: since the apparatus detects whether or not a person is in a room using the infrared sensor 104 and only selects one of alternative room temperature sensors 103, 107 to transfer a signal indicative of room temperature for controlling the operation of the air conditioner, the apparatus cannot precisely control the operation of the air conditioner so as to control temperature based on the movement degree of the person when in a room. For instance, when the air conditioner functions as a cooler, the air conditioner must operate more effectively when a person actively works in the room, the cooling operation of the air conditioner should be mild when the human being is sitting on a chair without working actively, and the cooling operation should be even milder to prevent the person sleeping in the room from getting a cold. Thus, the required operation of the air conditioner differs due to the activity or degree of movement of the person in the room.

SUMMARY OF THE INVENTION

The present invention has been developed in the light of the above described disadvantage. Accordingly, it is an object of the present invention to provide a room temperature controlling apparatus used for an air conditioner, by which a preset temperature in a room can be changed based on the degree of movement of persons present in the room, thus comfortably controlling the temperature in the room based on the degree of movement of persons in the room.

To attain the above described object, a room temperature controlling apparatus used for an air conditioner of a preferred embodiment of the present invention comprises a room temperature sensor for detecting the temperature in a room; a reference temperature setting means for setting a reference temperature for said room; a movement sensor for detecting movement of a person in said room and outputting signals representative of the detection of the movement of said person; a room temperature modification means for modifying the room temperature detected by said room temperature sensor based on the signals transferred from said movement sensor; and an operation control means for outputting a signal to control the operation of the air conditioner according to the reference temperature set by said reference temperature setting means and the room temperature modified by said temperature modification means.

A room temperature controlling apparatus used for an air conditioner of another preferred embodiment of the present invention comprises a room temperature sensor for detecting the temperature in a room; a reference temperature setting means for setting a reference temperature for said room; a movement sensor for detecting movement of a person in said room and outputting signals representative of the detection of the movement of said person; a reference temperature modification mean for modifying said reference temperature based on the signals transferred from said movement sensor; and an operation control means for outputting a signal to control the operation of the air conditioner according to the room temperature detected by said room temperature sensor and the reference temperature modified by said reference temperature modification means.

The room temperature controlling apparatus constructed above functions as follows in the cooling or heating operation:

(i) When heating:

If no person is present in the room, the movement sensor does not output a movement detection signal, and the movement degree based on the signal is zero, and the reference temperature modification means does not modify the reference temperature, thus a preset value for the room temperature is set and kept at the lowest temperature within the allowable range.

If a person enters and engages in some activity in the room, the movement sensor continues to output movement detection signals, thus the movement degree based on the signals turns to a high level, differing from the previous status. Therefore, the reference temperature modification means modifies the reference temperature from the minimum value to a higher value with a large change, thus the preset value of the room temperature is kept at the maximum value within the allowable temperature range.

If the person in the room remains stationary, for instance, to read a book, the frequencies of the movement detection signals outputted from the movement sensor lowers and the movement degree based on the signals decreases, thus the preset value of the room temperature is altered with a small change and kept at a value lower than the maximum value.

If the person sleeps in the room, the frequencies of the movement detection signals outputted from the movement detection means further lowers and the movement degree based on the signals further decreases, thus the reference temperature of the room temperature is modified to a further lower side by the reference temperature modification means. If the preset value is equal to the minimum value within the allowable range, the room temperature is kept at the minimum value.

If the person rolls over in bed, the movement degree based on the movement detection signals outputted from the movement sensor changes with a small value, the reference temperature is modified to a higher side with a small value by the reference temperature modification means.

If the person wakes up and starts an activity in the room, the frequencies of movement detection signals outputted from the movement sensor turns higher and increases the movement degree based on the signals, thus the preset value of the room temperature is changed to the maximum value within the allowable range by the reference temperature modification means.

(ii) During cooling operation:

If no person is present in the room, the movement sensor does not output a movement detection signal, and the movement degree based on the signal is zero and does not change, thus the preset value for the room temperature is set and kept at the highest temperature within the allowable range.

If a person enters and engages in some activity in the room, the movement sensor continues to output movement signals, thus the degree of movement based on the signals turns to a high level, differing from the previous status. Therefore, the reference temperature modification means modifies the reference temperature from the maximum value to a lower value with a large change, thus the preset value of the room temperature is kept at the minimum value within the allowable temperature range.

If the person in the room remains stationary, for instance, to read a book, the frequencies of the movement detection signals outputted from the movement sensor lowers and the movement degree based on the signals decreases, thus the preset value of the room temperature is altered with a small change and kept at a value higher than the minimum value.

If the person sleeps in the room, the frequencies of the movement detection signals outputted from the movement sensor means further lowers and the movement degree based on the signals further decreases, thus the preset value is made higher by the reference temperature modification means. If the preset value is equal to the maximum value within the allowable range, the room temperature is kept at the maximum value.

If the person rolls over in bed, the movement degree based on the movement detection signals outputted from the movement sensor changes with a small value, the preset room temperature is decreased to a small value.

If the person wakes up and starts to act in the room, the frequencies of movement detection signals outputted from the movement sensor turns higher and increases the movement degree based on the signals, thus the preset value of the room temperature is changed to the minimum value within the allowable range.

BRIEF DESCRIPTION OF THE DRAWINGS

The objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
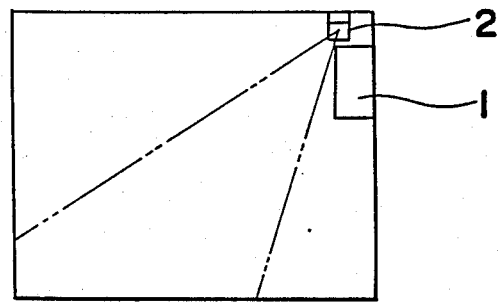
FIG. 1 is a schematic drawing showing the configuration of an embodiment of the present invention.

Before the description of the present invention proceeds, it is to be noted that like parts are designated by like reference numerals throughout the accompanying drawings.

FIG. 1 is a schematic drawing showing the configuration of a room temperature controlling apparatus used for an air conditioning according to an embodiment of the present invention.

In this figure, numeral 1 designates an indoor unit which is a part of the air conditioner; numeral 2 designates a movement sensor comprising a pyroelectric infrared sensor, which has a light converging unit and reflection unit (those units are not shown in the figure), in which multiple-divided reflection surfaces are constructed in a semispheric shape, thus the sensor has a detection area comprising multiple divided projection patterns so that the sensor can accurately detect the minute movement of persons in a room.

The movement sensor 2 includes a differential circuit not shown in figures to output a pulse representative of movement.

Figure 2:
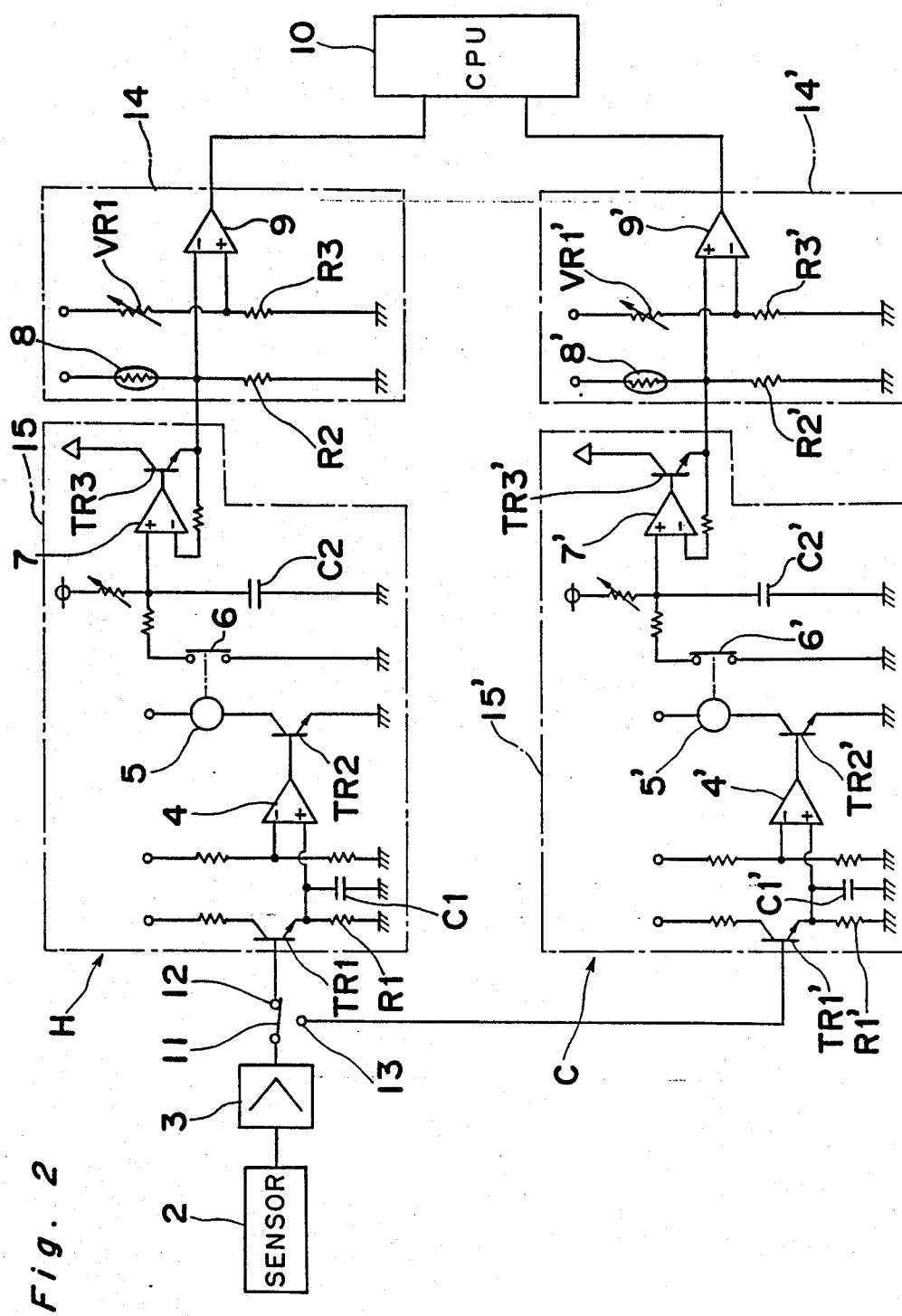
FIG. 2 is a circuit diagram.

The movement detection signal outputted from the movement sensor 2 eliminates noise with a filter (not shown in figures) installed inside the sensor. Only the infrared beams whose wavelength corresponds to the body temperature of a human being (for instance, 30° C. to 40° C., when the sensor has a high resolution, it may be set at 35° C. to 38° C.) are selected with a band-pass filter 3, as shown in FIG. 2, and thus movement detection signals are outputted.

The output terminal of the band-pass filter 3 is connected to the common terminal of a heating/cooling selector switch 11. Selection terminals 12 and 13 of the heating/cooling selector switch 11 are connected to th circuit H for controlling room temperature during the heating operation and the circuit C for controlling room temperature during the cooling operation.

Figure 3:
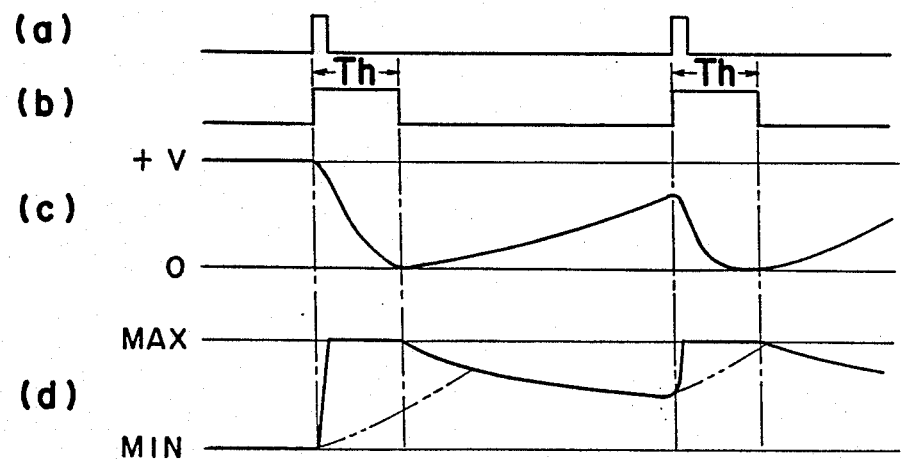
FIG. 3 is a waveform drawing showing the signals in the circuit.

First, the circuit H for controlling room temperature during the heating operation will be explained with reference to FIGS. 2 and 3. When a movement detection signal is outputted from the band-pass filter 3 with a pulse waveform shown in FIG. 3(a), the signal is applied, through the switch 11, to the base of the first transistor TR1 of the circuit H and the first transistor TR1 is conductive only when the movement detection signal is outputted as shown in FIG. 3(a). The emitter voltage of the first transistor TR1 is applied to the noninverting input terminal of a comparator 4. the electric charges, stored in a capacitor C1 during the time when the transistor TR1 is conductive, are discharged with a time constant determined by the capacitor C1 and resistor R1 after the first transistor TR1 turns off. Thus, a voltage higher than the voltage applied to the inverting input terminal is applied to the noninverting input terminal of the comparator 4 only during a period determined by the above time constant. As a result, an high level signal is outputted from the comparator 4 during a period Th extended several seconds as shown in FIG. 3(b) per one movement detection signal shown in FIG. 3(a). The high level signal outputted from the comparator 4 makes the second transistor TR2 conductive. During this period, a relay coil 5 is energized to close the relay contact 6. If an additional signal is outputted from the movement sensor 2 before the predetermined time Th lapses, the second transistor TR2 continues to be in a conductive status, keeping the relay contact 6 closed. If a movement detection signal is not outputted during a time duration of the predetermined period Th, the second transistor TR2 turns to a OFF status and opens the relay contact 6.

When the relay contact 6 is closed, the capacitor C2 discharges to zero V through the relay contact 6 during a predetermined period Th in seconds as shown in FIG. 3(c), lowering the output voltage from an amplifier 7. As a result, a third transistor TR3 turns off, and the input voltage value divided by a thermistor 8, which is a room temperature sensor for detecting the temperature in a room, and a resistor R2 is compared by means of the comparator 9, which is an operation control means, with the reference voltage value determined by the voltage divided by a variable resistor VR1, which is a reference temperature setting means, and by a resistor R3. When the input voltage value is smaller than the reference voltage value, that is, when the temperature in the room is lower than the preset temperature and the resistance determined by the thermistor 8 turns larger than the preset value, a signal of a high level is outputted from the comparator 9.

On the contrary, if a movement detection signal is not outputted from the movement sensor 2 during the predetermined period Th, that is, the person in the room does not engage in any activity for the predetermined period Th, or longer, the relay contact 6 opens and the third transistor TR3 becomes conductive, and the input voltage value of the inverting input terminal of the comparator 9 is higher than that when the transistor TR3 is not conductive if the temperature in the room is the same as the temperature described above. Therefore, in order to obtain an input voltage value lower than the reference voltage value, the temperature in the room should be lower than the value when a person moves in the room, otherwise the high level signal is not outputted from the comparator 9.

The signal outputted from the comparator is inputted into a CPU 10 provided in the indoor unit 1 of the air conditioner. The CPU 10 activates in response to the comparator output of the high level and functions to start the heating operation.

The room temperature controlling circuit C, used for the cooling operation, uses a configuration similar to the room temperature controlling circuit H used for the heating operation described above. The corresponding components are expressed with the same number with an apostrophe ('), and their explanations are omitted.

In the room temperature controlling circuit C, used for cooling operation described above, the input voltage value divided by a thermistor 8' and a resistor R2' is inputted into the noninverting input terminal of a comparator 9', which finally outputs the comparison output. The reference voltage value determined by the voltage divided by the variable resistor VR1' and a resistor R3' is inputted into the inverting input terminal of the comparator 9'. These voltage values are compared with each other in the comparator 9'. When the input voltage value is higher than the reference voltage value, that is, the temperature in the room rises higher than the preset temperature and makes the resistance value of the thermistor 8' lower than a predetermined value, a high level signal is outputted from the comparator 9'.

As a result, for instance in a heating operation, the preset temperature is abruptly changed to the maximum value in the allowable range in response to the output of movement detection signals, as shown in FIG. 3(d). If no movement detection signal is outputted in the predetermined period Th, the preset value of the room temperature is gradually lowered to the maximum value in the allowable range. With the further output of the movement detection signal, the preset value of the room temperature is abruptly changed to the maximum value in the allowable range. On the other hand, since the actual temperature in the room requires sufficient time to attain the preset value, the actual temperature changes in the manner as shown by the two-dot chain line in FIG. 3(d).

Accordingly, an average of the maximum value within the allowable range and the value set immediately before the following movement detection signal is outputted, is valid as the room temperature. When the person actively moves in the room, the preset temperature is rapidly changed from the minimum to the maximum values in the allowable range. If the person stops moving actively in the room, the preset temperature is gradually changed from the maximum value in the allowable range to the intermediate value between the maximum and minimum values.

The above described relationships in the case of the cooling operation are the same as those in the heating operation except that the maximum and minimum values replace each other.

In the room temperature controlling circuit H, used during the heating operation, the circuit 15 including the capacitors C1, C2, resistor R1, comparators 4, 7, transistors TR1, TR2, TR3, relay coil 5 and relay contact 6 is designated as a room temperature modification means. In the room temperature controlling circuit C, used during the heating operation, the circuit 15' including the capacitors C1', C2', resistor R1', comparators 4', 7', transistors TR1', TR2', TR3', relay coil 5' and relay contact 6' is designated as a room temperature modification means.

The functions of the embodiment will be described below.

Figure 4:
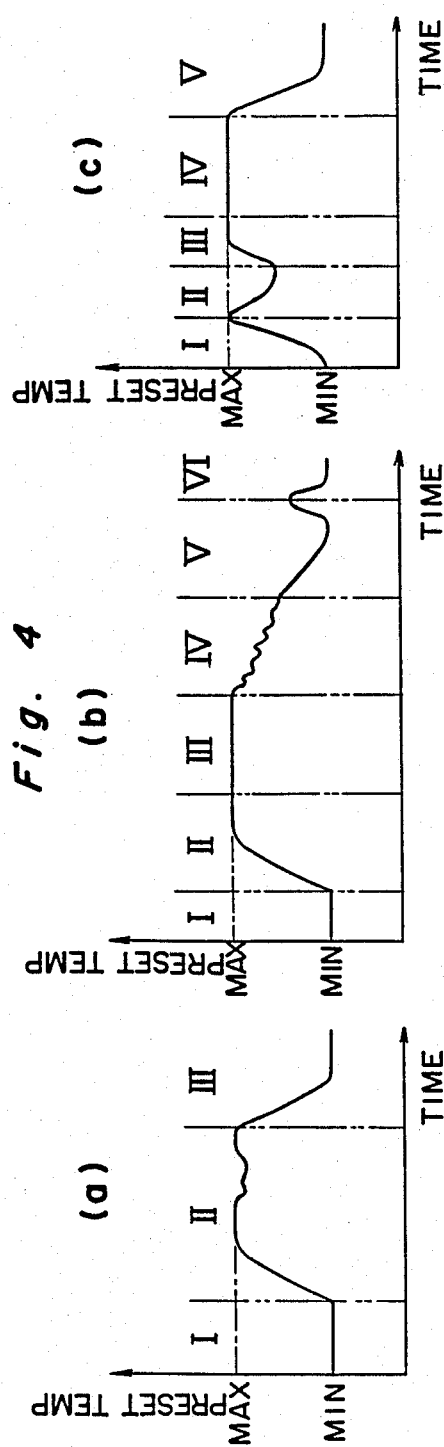
FIGS. 4(a), (b), and (c) are time charts showing the changes in the preset temperature during heating operation.

(1) During the heating operation:

(A) When a person enters or goes out of the room (The temperature control in this case is shown in FIG. 4(a).):

When no person is present in the room, no signal representative of movement detection is outputted from the movement sensor 2. Therefore, the degree of movement determined according to the signal is zero and does not change. Thus, the preset value of the room temperature remains at the minimum value MIN within the allowable range as shown in region I of FIG. 4(a).

If a person enters the room and moves around actively, signals indicative of the movement detection are continuously outputted from the movement sensor 2, the movement degree increasing according to the signals. As a result, the preset temperature is greatly altered from the previous set value, that is, from the minimum value MIN of the allowable range of the preset room temperature to a higher temperature. If the movement degree of the person continues at a high level, the preset temperature is set at the maximum value MAX within the allowable range of the preset temperature and remains at this value. If the person stops moving actively and acts quietly, for instance to read a book, the movement degree slightly decreases. The preset value is minimally altered to a lower temperature according to the change in the movement degree. These alterations of preset temperature are shown in region II in FIG. 4(a).

If the person leaves the room, the preset temperature is changed from the maximum value MAX to the minimum value MIN of the allowable range and maintained at the minimum temperature MIN, as shown in region III of FIG. 4(a).

(B) When a person is asleep in the room: (The temperature control in this case is shown in FIG. 4(b).):

When a person enters the room, the degree of movement determined according to the signals outputted from the movement sensor 2 becomes high, thus the preset temperature changing greatly from the minimum value MIN to a higher value as shown in region II of FIG. 4(b). If the movement degree continues at a high level, the preset value is set at the maximum temperature MAX and maintained at the value. During the period the person is preparing for sleep, for instance, to prepare the bed, to change into sleepware, etc., the preset temperature is kept at the maximum value MAX as shown in region III of FIG. 4(b).

When the person in bed moves slightly, the movement degree based on the signals outputted from the movement sensor 2 slightly lowers, thus the preset temperature changing to a slightly lower level as shown in region IV.

As the person is falling asleep, the preset temperature is gradually altered to a further lower level and finally set at the minimum value MIN as shown in region V. If the person rolls over in bed, for example, the movement degree slightly changes to alter the preset temperature to a minimally higher level as shown in regions V and VI.

(C) When a person awakes in the room: (The temperature control in this case is shown in FIG. 4(c).):

When a person wakes and gets up, the movement degree determined according to the signals outputted from the movement sensor 2 greatly changes, thus the preset temperature being altered to a higher level over a large range as shown in region I of FIG. 4(c). If the person leaves the room, the movement degree changes to zero, thus the preset temperature being changed to a lower level as shown in region II. If the person is out of the room temporarily and returns to the room before the preset temperature changes to the minimum value MIN, the movement sensor 2 detects the person entering the room and outputs signals representative of the detection, thereby altering the preset temperature to the maximum value MAX as shown in region III.

Following this, as the person actively moves while changing clothes and so on, the movement degree rises to a higher level. Thus, the preset temperature is kept at the maximum value MAX as shown in region IV.

After the person leaves the room, the preset temperature is set at the minimum value MIN as shown in region V.

Figure 5:
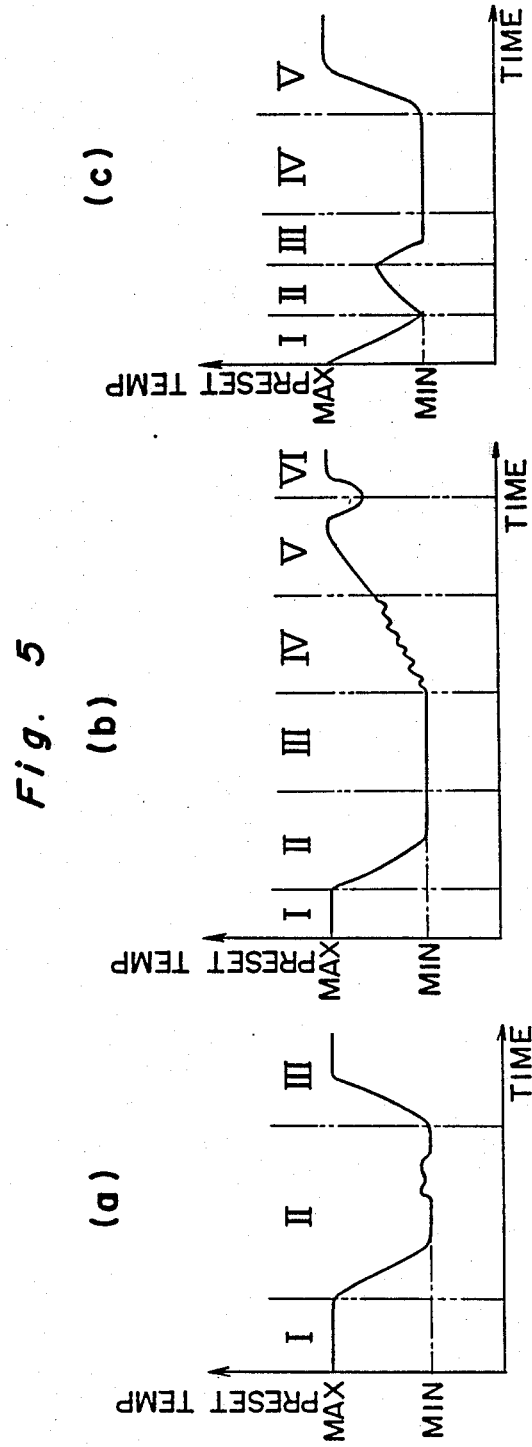
FIGS. 5(a), (b) and (c) are time charts showing the changes in the preset temperature during cooling operation.

(2) During the cooling operation:

(A) When a person enters or goes out of the room (The temperature control in this case is shown in FIG. 5(a).):

When no person is present in the room, no signal is outputted from the movement sensor 2. Therefore, the degree of movement determined according to the signal outputted from the movement sensor 2 is zero and does not change. Thus, the preset temperature for the room temperature remains at the maximum value (MAX) within the allowable range as shown in region I of FIG. 5(a).

If a person enters the room and moves around actively, signals indicative of the movement detection are continuously outputted from the movement sensor 2, the degree of movement increasing according to the signals. As a result, the preset temperature is greatly altered from the previous set value, that is, from the maximum value MAX within the allowable range of the preset room temperature to a lower temperature. If the movement degree of the person continues at a high level, the preset temperature is set at the minimum value MIN within the allowable range of the preset temperature and remains at this value. If the person stops moving actively and acts quietly, for instance to read a book, the movement degree slightly decreases. Then, the preset temperature is minimally altered to a higher value according to the decrease in the movement degree. These alterations of preset temperature are shown in region II in FIG. 5(a).

If the person leaves the room, the preset temperature is changed from the minimum value MIN to the maximum value MAX of the allowable range and maintained at the maximum temperature MAX, as shown in region III of FIG. 5(a).

(B) When a person is asleep in the room: (The temperature control in this case is shown in FIG. 5(b).):

When a person enters the room, the degree of movement determined according to the signals outputted from the movement sensor 2 becomes high, thus the preset temperature changing from the maximum value MAX to a lower value as shown in regions II. If the degree of movement continues at a high level, the preset value is set at the minimum temperature MIN and maintained at the value. During the period the person is preparing for sleep, for instance, to prepare the bed, or change into pajamas, the preset temperature is kept at the minimum value MIN as shown in region III of FIG. 5(b).

When the person in bed moves slightly, the degree of movement based on the signals outputted from the movement sensor 2 slightly lowers, thus the preset temperature is changed to a slightly higher level as shown in region IV.

As the person is falling asleep, the preset temperature is gradually altered to a higher level and finally set at the maximum value MAX as shown in regions IV and V. If the person rolls over in bed, the movement degree slightly changes to alter the preset temperature to a minimally lower level as shown in regions V and VI.

(C) When a person awakes in the room: (The temperature control in this case is shown in FIG. 5(c).):

When a person wakes and gets up, the degree of movement determined according to the signals outputted from the movement sensor 2 greatly changes, thus the preset temperature being altered to a lower level over a large range as shown in region I of FIG. 5(c). If the person leaves the room, degree of movement changes to zero, thus the preset temperature being changed to a higher level as shown in region II. If the person is out of the room temporarily and returns to the room before the preset temperature changes to the maximum value MAX, the movement sensor 2 detects the person entering the room and outputs signals representative of the detection, thereby altering the preset temperature to the minimum value MIN as shown in region III.

Following this, as the person moves around and changes clothing and so on, the degree of movement rises to a higher level. Thus, the preset temperature is kept at the minimum value MIN as shown in region IV.

After the person goes out of the room, the preset temperature is set at the maximum value MAX as shown in region V.

Figure 6:
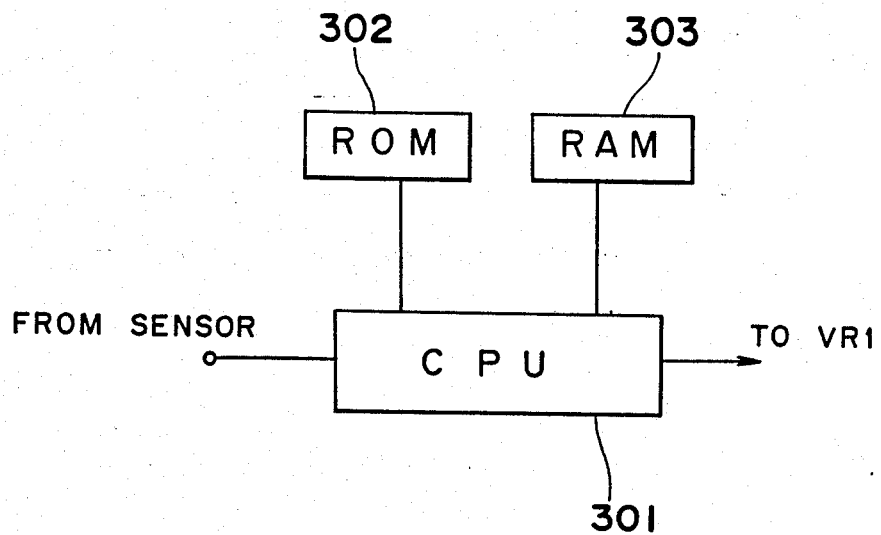
FIG. 6 is a block diagram showing another embodiment of the present invention.
Figure 8:
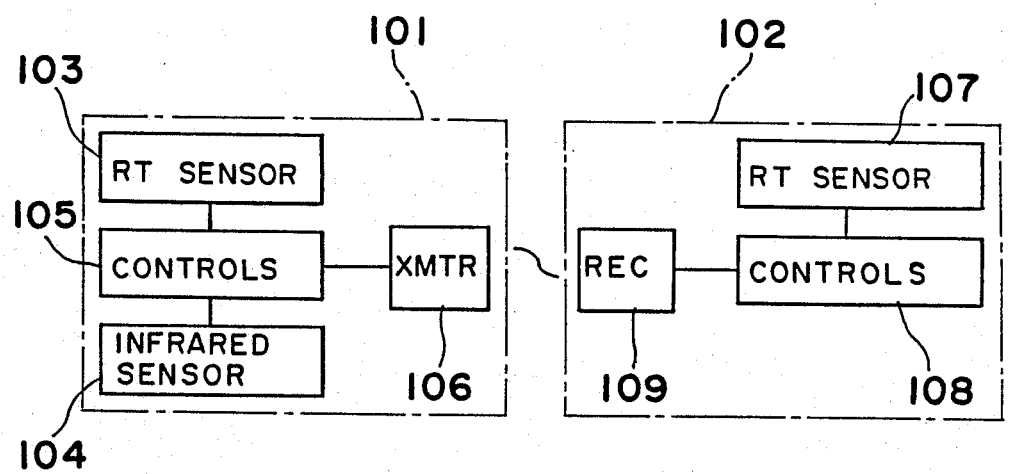
FIG. 8 is a block diagram showing a conventional apparatus.
Figure 7:
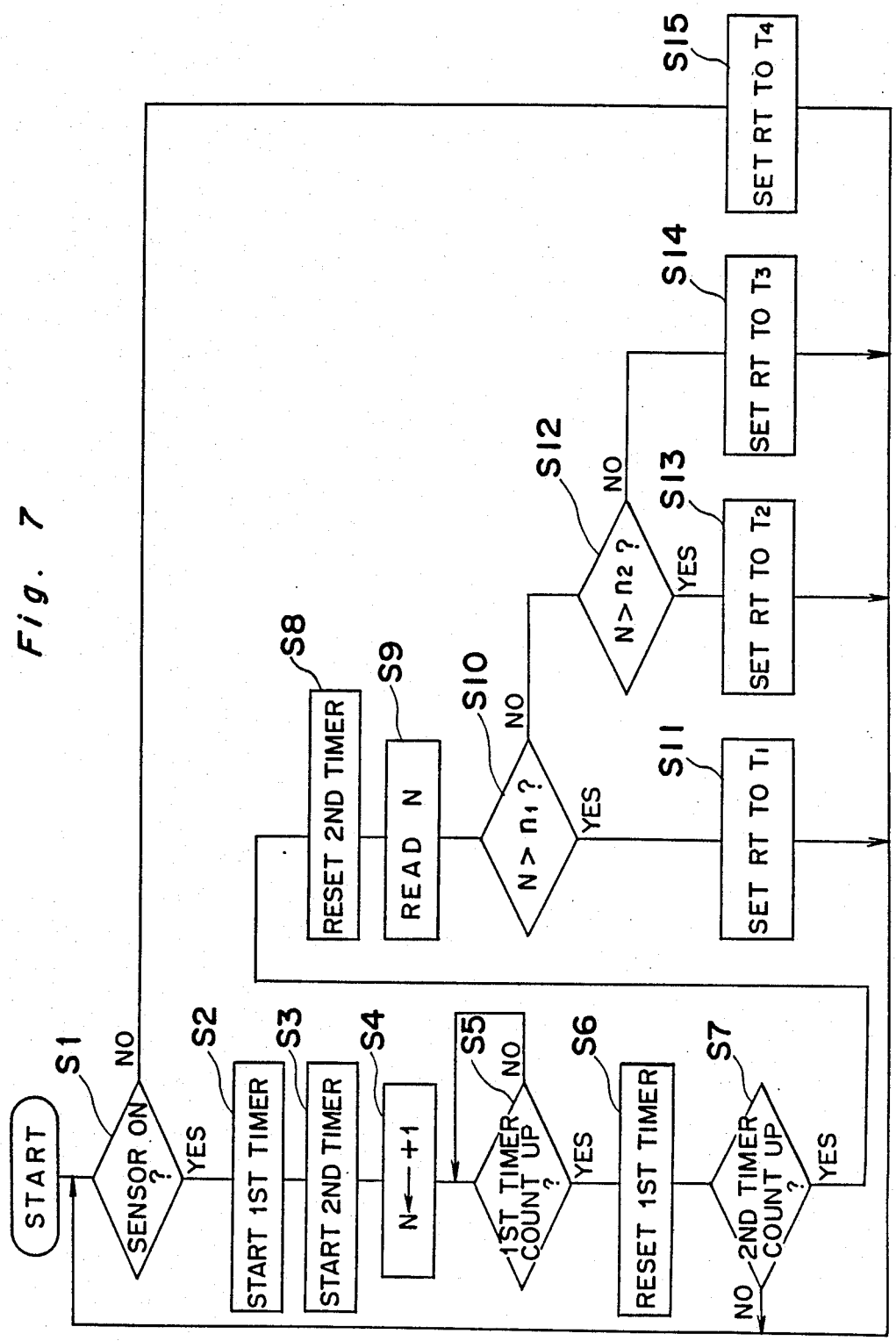
FIG. 7 is a flow chart showing the operation flow in the above embodiment.

Next, another embodiment of the present invention will be mainly described regarding its function during heating operation with reference to FIGS. 6 and 7.

In this embodiment, a microcomputer shown in FIG. 6 controls the preset temperature in the room based on the degree of movement of a human being. The microcomputer comprising a central processing unit (CPU) 301, a read only memory (ROM) 302, and a random assess memory (RAM) 303 is incorporated into an indoor unit of an air conditioner. The microcomputer functions according to the flow chart shown in FIG. 7 as a reference temperature modification means and operates and controls a variable resistor VR1, which is the reference temperature setting means.

First, it is discriminated, at step S1 shown in FIG. 7, whether or not the movement sensor 2 is turned on. If a pulse representative of the movement detection is outputted from the movement sensor 2, the program proceeds to step S2, starting a first timer, which ensures the operation time (for instance, 5 to 30 seconds) of the movement sensor 2. Then, the program advances to step S3 at which a second timer is started so as to determine unit duration (for instance, 5 to 10 minutes) for counting the number of pulses outputted from the movement sensor 2.

Then, the program proceeds to step S4 at which the number N of pulses outputted from the movement sensor 2 is counted. It is determined, at step S5, whether or not the first timer has counted up the operation time of the movement sensor 2. If the first timer has not counted this timer up yet, the rest of time is counted for the operation completion of the movement sensor 2. After the elapse of the operation time, the program proceeds to step S6, at which the first timer is reset.

The program advances to step S7, at which it is discriminated whether or not the second timer completes the count up, that is, the predetermined unit duration has elapsed. Until the predetermined time has elapsed, the microcomputer continues to count the number N of pulses indicative of the movement detection at step S4 by repeating the loop consisting of steps from S1 to S7.

If it is determined, at step S7, that the unit time has elapsed, the microcomputer resets the second timer at step S8, and reads the number N of pulses outputted from the movement sensor 2 at step S9.

Then, it is discriminated, at step S10, whether or not the number N of pulses is larger than a first set value (for instance, $n_1$). If the number N of pulses is larger than the first set value $n_1$, it is judged that the movement degree of the person is at a high level, and the program proceeds to step S11, thus the microcomputer setting the preset temperature i.e. reference temperature at the maximum value T1 within the allowable range by controlling the variable resistor VR1 as shown in FIG. 2.

If the number N of pulses is judged to be smaller than the first set value $n_1$ at step S10, the program proceeds to step S12, where it is discriminated whether or not the number N of pulses is larger than a second set value $n_2$ (which is smaller than the first set value $n_1$). If the number N of pulses is larger than the second set value $n_2$, the movement degree of the person is judged to be at a relatively high level. Thereafter, the program advances to step S13, at which the preset temperature is set at a first intermediate temperature T2 by means of the variable resistor VR1.

If the number N of pulses is smaller than the second set value $n_2$ at step S12, it is determined that the movement degree of the person is at a low level, and then, the program advances to step S14, at which the preset temperature is set at second intermediate temperature T3.

When it is judged, at step S1, that no signal is outputted from the movement sensor 2, the movement degree of the person is regarded as zero. Therefore, the preset temperature is set at the minimum value T4 within the allowable range at step S15.

In cooling operation, the maximum temperature T1 and the minimum temperature T4 are replaced with the minimum temperature and the maximum temperature respectively, thus the relationship to each other is $T1 < T2 < T3 < T4$.

The application of the present invention is not limited to the room temperature controlling apparatus used for an air conditioner which can be used for cooling and heating operations. The present invention can be also applied to the room temperature controlling apparatus used for an air conditioner which can be used as either a cooler or a heater.

As clearly described above, the room temperature controlling apparatus according to the present invention can control the room temperature in accordance with the degree of movement of a person in a room both in cooling and heating operations. When a person enters the room and rapid cooling or heating the room is desired, the room temperature controlling apparatus sets the preset temperature at the minimum or maximum value within the allowable range, allowing rapidly cooling or heating of the room. In cooling operation, if the person in the room is asleep in bed, the controlling apparatus maintains the room temperature at the maximum value, preventing the person from getting a cold due to an excessive cooling operation. Moreover, if the person feels hot and rolls over in bed, the apparatus detects the movement of the person and alters the preset temperature to a lower level, thus making the person sleep comfortably. On the contrary, in heating operation, if the person in the room is asleep in bed, the apparatus maintains the room temperature at the minimum value within the allowable range. If a sleeping child should inadvertently discard a covering blanket or get out of it, for example, the apparatus detects the movement of the child and alters the preset temperature to a higher level, thus preventing the child from taking cold and ensuring that the child sleeps comfortably.

Thus, the room temperature controlling apparatus according to the present invention allows an air conditioner to control the room temperature to a comfortable and healthy level based on the degree of movement of the person present in the room. In addition, the apparatus can avoid unnecessary cooling or heating operation, thereby saving electric power consumption.

Although the present invention has been described in connection with preferred embodiments thereof, many variations and modifications will now become apparent to those skilled in the art. It is preferred, therefore, that the present invention is limited not by the specific disclosure herein, but only by the appended claims.

What is claimed is:

1. A room temperature controlling apparatus used for an air conditioner comprising:
   a room temperature sensor for detecting the temperature in a room and developing a detected temperature signal;
   reference temperature setting means for setting a reference signal related to a reference temperature for said room;
   a movement sensor for detecting movement of one or more persons in said room and outputting movement signals in accordance with the detection of the movement of the said one or more persons;
   room temperature modification means for determining a degree of movement of any persons present in the room from said movement signals and modifying said detected temperature signal by continuously varying the level of said signal in dependence to the determined degree of movement; and
   operation control means for outputting an output signal to control the operation of the air conditioner according to the reference temperature set by said reference temperature setting means and the detected temperature signal modified by said temperature modification means.

2. A room temperature controlling apparatus used for an air conditioner as claimed in claim 1, wherein said operation control means includes a comparator which compares the reference signal with the modified detected temperature signal so as to output the output signal to stop the operation of the air conditioner when both temperatures are equal.

3. A room temperature controlling apparatus used for an air conditioner as claimed in claim 1, wherein said movement sensor consists of a pyroelectric infrared sensor.

4. The room temperature conditioning apparatus of claim 1 wherein said room temperature modification means modifies said detected temperature signal by continuously varying the level of said signal in dependence to the determined degree of movement.

5. A room temperature controlling apparatus used for an air conditioner comprising:
   a room temperature sensor for detecting the temperature in a room and developing a detected temperature signal;
   reference temperature setting means for setting a reference signal related to a reference temperature for said room;
   a movement sensor for detecting movement of one or more persons in said room and outputting movement signals in accordance with the detection of the movement of the said one or more persons;
   reference temperature modification means for determining a degree of movement of any persons present in the room from said movement signals and modifying said reference signal to a selected one of multiple levels in dependence to the determined degree of movement; and
   an operation control means for outputting an output signal to control the operation of the air conditioner according to the room temperature detected by said room temperature sensor and the reference temperature modified by said reference temperature modification means.

6. A room temperature controlling apparatus used for an air conditioner as claimed in claim 5, wherein said operation control means includes a comparator which compres the detected temperature signal with the modified reference signal so as to output the output signal to stop the operation of the air conditioner when both temperatures are equal.

7. A room temperature controlling apparatus used for an air conditioner as claimed in claim 5, wherein said movement sensor consists of a pyroelectric infrared sensor.

8. The room temperature conditioning apparatus of claim 5 wherein said room temperature modification means modifies said reference signal by continuously varying the level of said signal in dependence to the determined degree of movement.

* * * * *